United States Patent [19]
Weber

[11] Patent Number: 5,961,262
[45] Date of Patent: Oct. 5, 1999

[54] CARGO SECURING ARRANGEMENT IN A MOTOR VEHICLE CARGO SPACE

[75] Inventor: Norbert Weber, Bondorf, Germany

[73] Assignee: DaimlerChrysler AG, Stuttgart, Germany

[21] Appl. No.: 09/135,649

[22] Filed: Aug. 18, 1998

[30] Foreign Application Priority Data

Aug. 18, 1997 [DE] Germany .......................... 197 35 821

[51] Int. Cl.⁶ ..................................................... B60P 7/08
[52] U.S. Cl. ............................ 410/94; 410/121; 410/153
[58] Field of Search ................................ 410/94, 95, 107, 410/111, 121, 153; 248/351; 224/42.33, 42.35

[56] References Cited

U.S. PATENT DOCUMENTS

| | | | |
|---|---|---|---|
| 3,102,708 | 9/1963 | Crain | 410/107 |
| 4,416,579 | 11/1983 | Albeti | 410/94 X |
| 4,784,547 | 11/1988 | Prinz et al. | 410/153 X |
| 4,842,317 | 6/1989 | Moore | 410/94 X |
| 5,092,250 | 3/1992 | Halliar | 410/121 X |
| 5,785,473 | 7/1998 | Stark | 410/94 |

FOREIGN PATENT DOCUMENTS

| | | |
|---|---|---|
| 93 12 947.5 | 2/1994 | Germany . |
| 42 34 812 A1 | 4/1994 | Germany . |
| 2 118 490 | 11/1983 | United Kingdom . |
| 2 218 383 | 11/1989 | United Kingdom . |
| 2229982 | 10/1990 | United Kingdom ................ 224/42.33 |
| 2 267 876 | 12/1993 | United Kingdom . |
| 2 277 723 | 11/1994 | United Kingdom . |
| 2 301 067 | 11/1996 | United Kingdom . |
| 81/00392 | 2/1981 | WIPO . |
| 88/08379 | 11/1988 | WIPO . |

*Primary Examiner*—Stephen T. Gordon
*Attorney, Agent, or Firm*—Evenson, McKeown, Edwards & Lenahan, P.L.L.C.

[57] ABSTRACT

An arrangement for securing objects in a cargo space of a motor vehicle is fastened in the floor of the cargo space and has at least one supporting element which can be adjusted between an active position. The arrangement projects into the cargo space, and a passive position, in which a supporting element ends at a level with the cargo space floor, is configured such that it can be easily operated and does not hinder the loadability of the cargo space. The supporting element can be adjusted approximately perpendicularly to the plane of the cargo space floor and, in its active position, projects approximately perpendicularly into the cargo space.

10 Claims, 2 Drawing Sheets

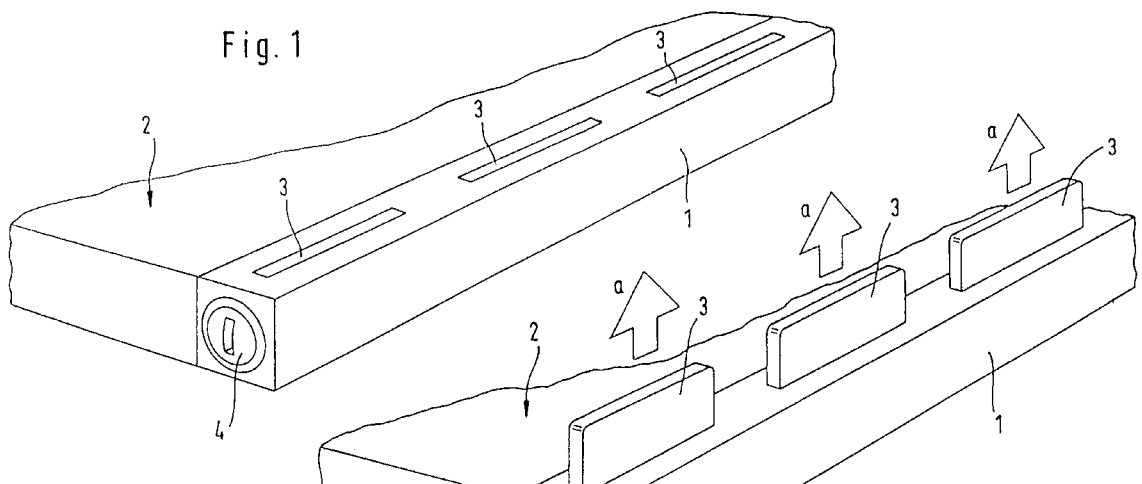
Fig. 1
Fig. 2
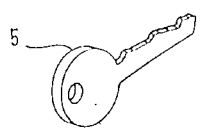

CARGO SECURING ARRANGEMENT IN A MOTOR VEHICLE CARGO SPACE

BACKGROUND OF THE INVENTION

This application claims the priority of German Patent Application No. 197 35 821.7, filed Aug. 18, 1997, the disclosure of which is expressly incorporated by reference herein.

The present invention relates to an arrangement for securing objects in a cargo space of a motor vehicle, and more particularly, to an arrangement which is fastened in the floor of the cargo space and has at least one supporting element which can be adjusted between an active position, in which it projects into the cargo space, and a passive position, in which it ends at a level with the cargo space floor.

An arrangement is known for preventing, in the cargo space of a motor vehicle (e.g., in the trunk of a passenger car) an independent displacement or sliding of the cargo, for example, of a box of beverages, when the vehicle is exposed to relatively strong longitudinal and/or lateral forces. The supporting element or the supporting elements of the known arrangement limit the possible adjusting path of the respective object and thereby prevent a sliding of the cargo.

DE-OS 42 34 812 A1 shows a recess provided in the floor of the vehicle trunk into which the supporting element can be sunk by folding over when it is not required. In this passive position, the supporting element ends on a level with the trunk floor and in this case is visually and physically integrated in the trunk floor, whereby it forms no obstacle, for example, when the trunk is loaded. So that the known arrangement or its supporting element can secure an object against a sliding in the trunk, it must itself be secured in its active position. Otherwise, lateral forces which affect it and are caused by the shifting cargo would cause a swinging-back into the recess, that is, into the passive position. The securing against an undesirable swinging-back-of the supporting element takes place by way of a swinging of an additional supporting wall which is disposed on the supporting element. In this instance, the trunk must not yet be loaded at least in the swinging area of this additional supporting wall. The operation of the known arrangement is therefore relatively cumbersome. In addition, the trunk floor becomes uneven as the result of the recess when the supporting element is in its active position so that smaller objects can no longer be placed securely on the trunk floor. Also, dirt accumulates relatively rapidly in such a recess.

DE 93 12 947 U1 also shows an arrangement for fixing objects in a cargo space of a vehicle. There, a plurality of openings are provided in a cargo space floor into which pin-type retaining buttons can be fitted which will then be immovably fixed on the cargo space floor and can additionally be secured by corresponding locking devices against being pulled out of the openings. In order to secure an object in the cargo space by the known retaining buttons, the retaining buttons may interact with the respective object in different manners. It is, for example, suggested to screw the retaining buttons to the object or to provide the retaining buttons with a belt eye through which a corresponding retaining strap or belt can be guided for tying down the objects. Although the known arrangement effectively secures objects in the cargo space, the construction of the securing device requires high expenditures and is cumbersome because the retaining buttons must be individually positioned and anchored. In addition, all retaining buttons must be carefully removed for loading and unloading the cargo space in order to avoid damage to susceptible cargo objects. There is also the danger that the retaining buttons may be lost.

SUMMARY OF THE INVENTION

An object of the present invention is to provide an improved arrangement which is easy to operate and does not hinder the loadability of the cargo space.

According to the present invention, this problem has been solved by providing that the at least one supporting element is adjustable approximately perpendicularly to a plane of the cargo space floor, and, in the active position thereof, projects approximately perpendicularly into the cargo space, and in the passive position thereof, an end of the at least one supporting element facing the cargo space ends at a level with the cargo space floor.

The present invention is based on the general idea and recognition that an approximately vertically adjustable supporting element has the same surface requirement on the cargo space floor in its active and in its passive position and, particularly in the areas laterally adjoining the supporting element, causes no change of the cargo space floor which hinders the loading. In order to be able to operate the arrangement according to the present invention, only the space above the supporting elements must be free so that an easy operating or operability of the arrangement can be ensured.

In addition, lateral forces, which are caused by the luggage and act approximately in the plane of the cargo space floor, can cause no readjustment of the supporting elements, whereby the arrangement according to the present invention is ready to be used immediately when the supporting element has reached its active position without requiring additional measures for laterally supporting the supporting element.

According to a particularly advantageous embodiment of the present invention, a rail is provided in which the supporting element or the supporting elements can be adjusted or sunk. In this manner, the arrangement according to the present invention can be completely integrated in the rail so that it can be installed in the cargo space floor as a single assembly, which simplifies, for example, the mounting of the arrangement.

In yet a further development of the present invention, the arrangement can have the supporting elements preferably arranged in a separately adjustable manner, resulting in more design possibilities for the division of the cargo space floor into various cargo areas.

In order to increase the stability of the supporting element with respect to laterally acting forces, for example, by sliding pieces of luggage, a further feature of the present invention provides a guide for the supporting element which laterally supports the supporting element at least in its active position.

In order to be able to adjust the supporting element in a particularly simple manner between its active position and its passive position, the supporting element can be pre-stressed into its active position by spring devices, while it is held in its passive position by retaining devices. The supporting element is, for example, pressed manually from the active position into the passive position into the cargo space floor or into the rail. When the passive position is reached, the retaining devices are activated which will then retain the supporting element in this position. Special releasing devices are provided to release the retaining devices, i.e., in order to release the supporting element from its passive position.

These releasing devices can be constructed such that they will trigger the retaining devices when the supporting element exceeds a defined penetration depth into the cargo space floor or into the rail. In principle, such a mechanism is known, for example, from retractable rotary-type switches on an electric stove or from retractable grips in furniture.

In another embodiment of the arrangement according to the present invention, the releasing devices can be constructed in the form of an operating element which, in particular, may be a push button, a lever, a key or the like. Thereby, all supporting elements of a rail can then be simultaneously released from their passive position. A separate operating element may, however, also be provided for each supporting element.

In a particularly current preferred embodiment, the supporting elements or the rail containing the supporting elements can be arranged in parallel or perpendicularly to the longitudinal direction of the vehicle. In this manner, the cargo space, which itself has lateral boundaries which are aligned in a regular manner in parallel or perpendicularly to the longitudinal direction of the vehicle, can be optimally utilized.

Another advantageous embodiment of the arrangement according to the invention can have several supporting elements or rails extending in parallel or perpendicularly to one another. Thereby, areas of different sizes in the cargo space can be bounded and secured so that the supporting elements can be adapted to the respective existing requirements in the cargo space for an optimal securing of the cargo objects.

In still another advantageous embodiment of the arrangement according to the present invention, the vehicle operator himself can determine the arrangement of the supporting elements corresponding to his individual desires and requirements concerning the cargo. For this purpose, the cargo space floor can, for example, consist in a relatively large area of floor elements whose dimensions correspond essentially to those of the rail. These floor elements and the rail are releasably fastened to the cargo space floor and can be arbitrarily exchanged for one another so that in this manner the rail can be displaced in parallel into the respective desired position.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic perspective view of an arrangement according to the present invention with its supporting elements in the passive position;

FIG. 2 is a view similar to FIG. 1 but with the supporting elements in their active position.

DETAILED DESCRIPTION OF THE DRAWINGS

Figure 3:
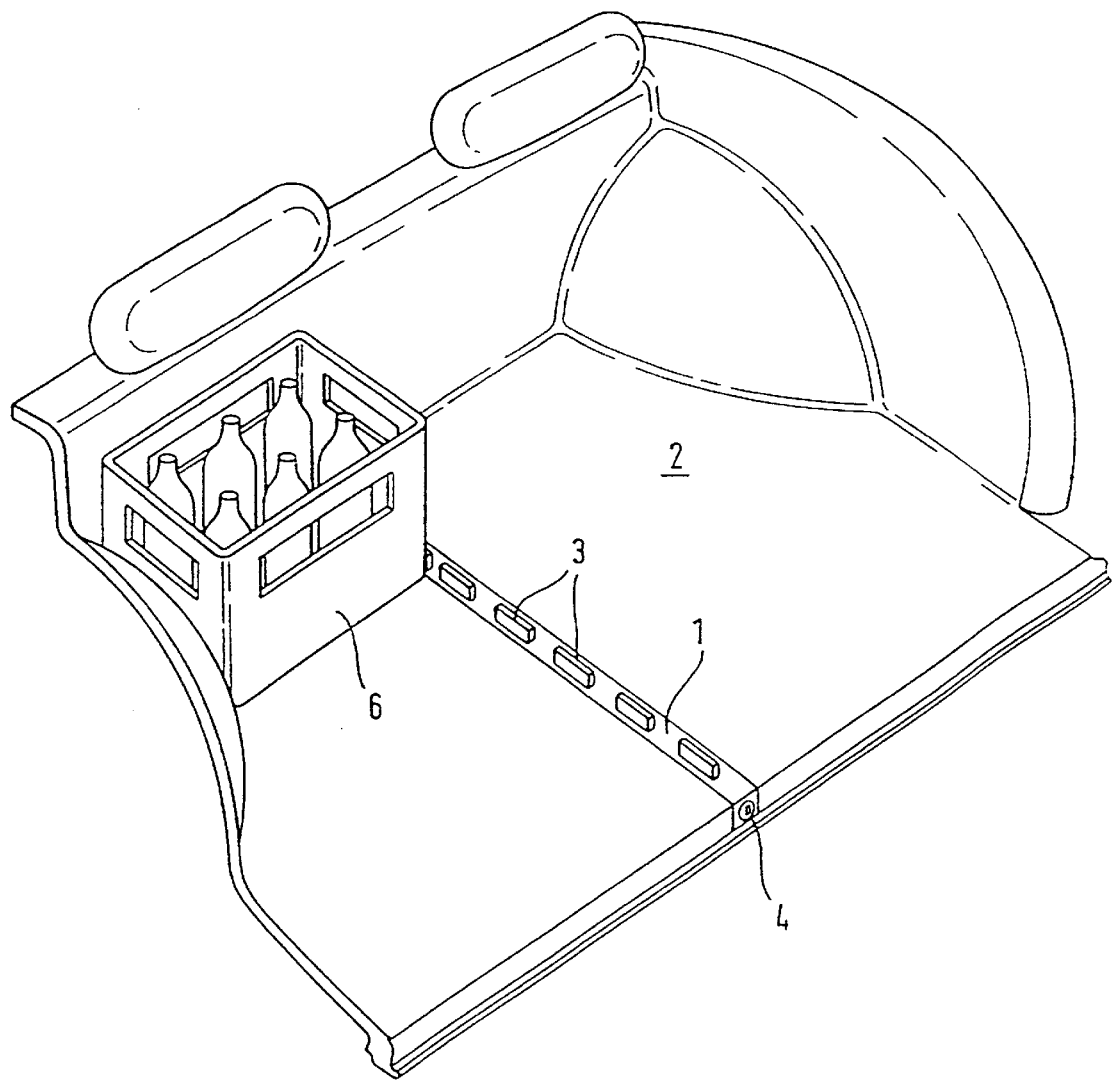
FIG. 3 is a perspective view of a cargo space with an arrangement according to the present invention which is integrated in the cargo space floor and whose supporting elements are situated in their active position.

Corresponding to FIG. 1 and 2, the arrangement according to the present invention has a rail 1 which consists, for example, of a rectangular tube. The rail 1 is housed or embedded such in a vehicle floor 2 that the top side of the rail 1 ends at a level with the top side of the cargo space floor 2.

Several supporting elements 3 are housed in the rail which are arranged to be aligned with respect to one another in a straight line. In the representation corresponding to FIG. 1, the supporting elements 3 are each in their passive position in which their upper end or their upper edge ends at a level with the top side of the rail 1 and thus with the surface of the cargo space floor 2.

The supporting elements 3 are held in their passive position by retaining devices (not shown). These retaining devices may consist, for example, of a tension type of detent device or locking device. In the illustrated embodiment, a lock 4 is provided for releasing the retaining devices. When this lock 4 is operated, all supporting elements 3 of the rail 1 are released by the retaining devices. Preferably spring devices (not shown) prestress the supporting elements 3 from their passive position into the active position so that the released supporting elements 3 can automatically take up their active position.

In FIG. 2, each of the supporting elements 3 is in its active position. The adjusting movement from the passive into the active position corresponding to the broad arrows a takes place approximately perpendicularly to the plane of the cargo space floor 2. The restoring movement correspondingly takes place in the opposite direction. For improving the adjusting movement, a guide (not shown) is provided in the rail 1 for each supporting element. This guide is preferably configured such that it laterally supports the supporting element 3 at least in the active position as will now be apparent to one skilled in this art.

In the illustrated embodiment, the supporting elements 3 have an approximately plate-shaped construction, whereby relatively few supporting elements 3 achieve a relatively large-surface lateral support for objects in the cargo space. Likewise, pin-shaped supporting elements can also be used which are constructed, for example, as solid cylinders or hollow cylinders.

In order to move the supporting elements 3 from their active position into the passive position, they can be pressed into the rail 1 jointly or, in another embodiment, also individually and separately. When the passive position is reached, the above-mentioned retaining devices are activated so that the respective supporting element 3 is held in this position. For releasing the retaining devices or the supporting elements from their passive position, the lock 4 is operated by a key 5. The key 5 and the lock 4 have a releasing effect on the retaining devices. They, for example, unlock the lock of a locking device or separate the detent connection of a detent device.

FIG. 3 is an example of the use of the arrangement according to the invention in a cargo space of a motor vehicle. The rail 1 is integrated in the cargo space floor 2 parallel to the longitudinal direction of the vehicle. In this case, the installation position of the rail 1 in the cargo space floor 2 is, for example, selected such that a standardized beverage case 6 can be deposited between a lateral boundary of the cargo space and the activated supporting elements 3 on the cargo space floor 2. As a result, the beverage case is secured at least on three sides against a lateral sliding, for example, during rapid cornering and/or driving through narrow curves. Although in the representation corresponding to FIG. 3, all supporting elements 3 of the rail 1 are in their active position, the arrangement according to the present invention can be constructed such that the respective not-required supporting elements 3 can be adjusted back into their passive position. In this manner, also relatively large objects can be housed unhindered in the remaining cargo space area.

It is also definitely within the scope of the invention to provide, instead of the single rail illustrated in FIG. 3 and extending in the longitudinal direction of the vehicle, several rails 1 which extend in parallel or perpendicularly to one another or cross one another, in which case the lock 4 or a corresponding operating element for releasing the retaining devices is preferably arranged on the top side of the rail 1. Likewise, a further embodiment is contemplated in which the rail 1 is releasably fastened in the cargo space floor so that it can be displaced parallel to itself.

The foregoing disclosure has been set forth merely to illustrate the invention and is not intended to be limiting. Since modifications of the disclosed embodiments incorporating the spirit and substance of the invention may occur to persons skilled in the art, the invention should be construed to including everything within the scope of the appended claims and equivalents thereof.

What is claimed is:

1. Arrangement for securing one or more objects in a cargo space of a motor vehicle and fastenable in the floor of the cargo space, comprising:

at least one supporting element adjustable between an active position, in which the at least one supporting element projects into the cargo space, and a passive position, in which the at least one supporting element ends at a level with a floor of the cargo space, wherein the at least one supporting element is adjustable approximately perpendicularly to a plane of the cargo space floor, and, in the active position thereof, projects approximately perpendicularly into the cargo space, and in the passive position thereof, an end of the at least one supporting element facing the cargo space ends at a level with the cargo space floor; and a rail in which the at least one supporting element is adjustably arranged, wherein the rail is fastened in the cargo space floor ending at a level therewith.

2. Arrangement according to claim 1, wherein the at least one supporting element or the rail extends at a distance from one another parallel or perpendicularly.

3. Arrangement according to claim 1, wherein the at least one supporting element comprises several supporting elements arranged in the rail and mutually aligned in a straight line.

4. Arrangement according to claim 1, wherein a guide is provided in one of the cargo space floor or the rail to guide the at least one supporting element during adjusting movement thereof approximately perpendicularly to the plane of the cargo space floor and to support the at least one supporting element approximately perpendicularly to the adjusting movement at least in the active position.

5. Arrangement according to claim 1, wherein the at least one supporting element is prestressed into the active position, and is releasably retained in the passive position.

6. Arrangement according to claim 5, wherein, when the at least one supporting element is pressed into the cargo space floor or into the rail beyond the passive position, releasing devices interact with retaining devices to cause release of the at least one supporting element.

7. Arrangement according to claim 6, wherein an operating element comprising one of a push button, a lever, and a key constitutes a releasing device for the at least one supporting element in the rail.

8. Arrangement according to claim 1, wherein the at least one supporting element or the rail is arranged parallel or perpendicular to a longitudinal direction of the motor vehicle.

9. Arrangement according to claim 1, wherein the rail is slidably or displaceably arranged in the cargo space floor, and securing device selectively releasably fasten the rail in the cargo space floor.

10. Arrangement according to claim 1, wherein the at least one supporting element has one of a plate-shaped and cylindrical configuration.

* * * * *

UNITED STATES PATENT AND TRADEMARK OFFICE
CERTIFICATE OF CORRECTION

| | | |
|---|---|---|
| PATENT NO. | : 5,961,262 | Page 1 of 1 |
| APPLICATION NO. | : 09/135649 | |
| DATED | : October 5, 1999 | |
| INVENTOR(S) | : Weber | |

It is certified that error appears in the above-identified patent and that said Letters Patent is hereby corrected as shown below:

Column 1, lines 3-7, delete "BACKGROUND OF THE INVENTION

This application claims the priority of German Patent Application No. 197 35 821.7, filed Aug. 18, 1997, the disclosure of which is expressly incorporated by reference herein." and insert -- CROSS-REFERENCE TO RELATED APPLICATION This application claims the priority of German Patent Application No. 197 35 821.7, filed Aug. 18, 1997, the disclosure of which is expressly incorporated by reference herein.

BACKGROUND OF THE INVENTION --.

Column 6, line 33, in Claim 9, delete "device" and insert -- devices --.

Signed and Sealed this
Twenty-seventh Day of March, 2012

David J. Kappos
*Director of the United States Patent and Trademark Office*